United States Patent

[11] 3,631,491

[72] Inventor William W. Cuthbert
 Oxnard, Calif.
[21] Appl. No. 6,070
[22] Filed Feb. 1, 1960
[45] Patented Dec. 28, 1971
[73] Assignee The United Sates of America as represented
 by the Secretary of the Navy

[54] TARGET VELOCITY DISCRIMINATOR
 4 Claims, 4 Drawing Figs.
[52] U.S. Cl...................................................... 343/8,
  343/7.7, 343/9, 343/13
[51] Int. Cl....................................................... G01s 9/42,
  G01s 9/44
[50] Field of Search........................................... 343/7.7, 8,
  9, 13

[56] References Cited
 UNITED STATES PATENTS
 2,621,243 12/1952 Sunstein........................ 343/7.7

*Primary Examiner*—Malcolm F. Hubler
*Attorneys*—Q. Baxter Warner and George J. Rubens CLAIM: 4. In an airborne radar apparatus designed to track a target and to yield range information with respect thereto, a differential amplifier including two cathode-coupled electron discharge devices to the respective control electrodes of which are applied a range-rate voltage from the said radar apparatus and an electrical quantity representative of $$V_a \cos \alpha \cos \theta$$

where $V_a$ = the airspeed of the craft carrying the radar
$\alpha$ = the vertical component of $\phi$, the angle formed by a line representing the direction of the target from the radar and a line representing the direction of heading of the radar-equipped aircraft
$\theta$ = the lateral component of $\phi$,
 a two-position relay the coil of which is connected across the anodes of the said two cathode-coupled electron discharge devices, whereby, when the respective outputs of the said two electron discharge devices are identical, no appreciable current will flow through the coil of said relay and the latter will be in one of its said tow positions, and, when the respective outputs of the said two electron discharge devices are not identical, current will flow through the coil of said relay and the latter will assume the other of its two said positions.

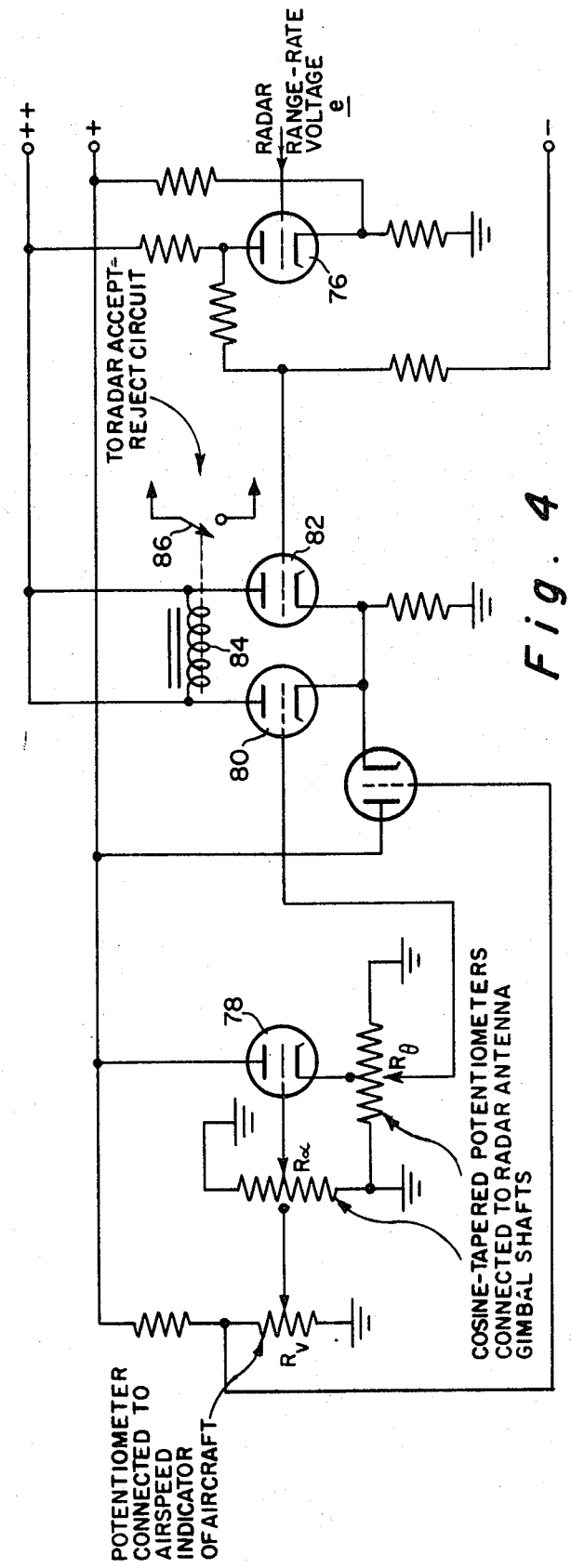
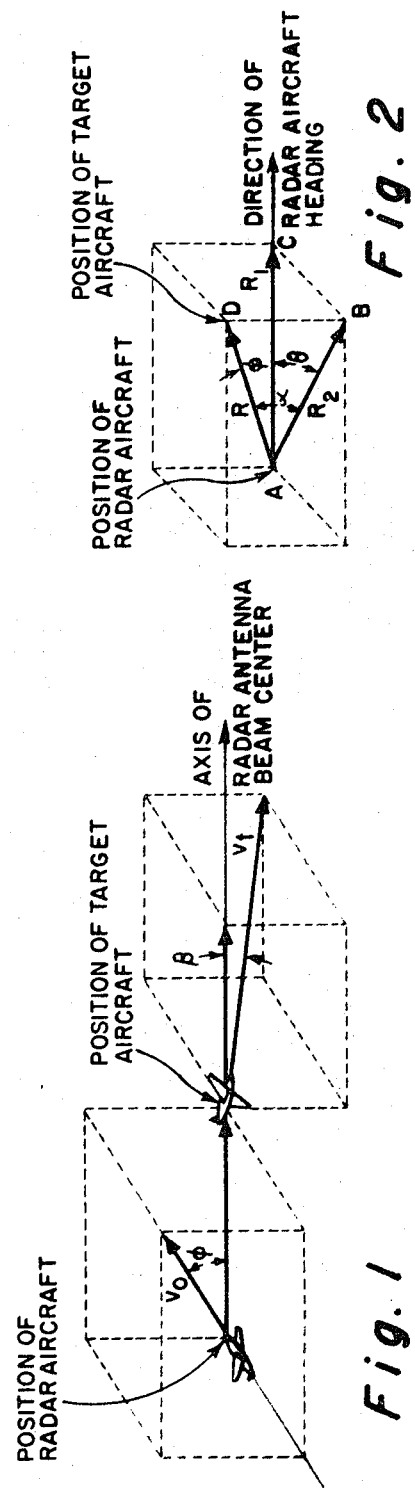

Patented Dec. 28, 1971

INVENTOR.
WILLIAM W. CUTHBERT
BY
George J. Kubens
ATTORNEY

TARGET VELOCITY DISCRIMINATOR

The invention described herein may be manufactured and used by or for the Government of the United States of America for governmental purposes without the payment of any royalties thereon or therefor.

The present invention relates to an airborne radar installation into which is incorporated apparatus capable of distinguishing between an essentially stationary target and one which is in motion, regardless of whatever angular relationship may exist between the direction of motion of the target and the path of the aircraft upon which the radar unit is mounted, except that such angular relationship shall be within the normal tracking capabilities of the radar.

On radar-equipped aircraft, it is highly desirably to have available means for determining the presence or absence of velocity in any object onto which the radar may lock. For example, when moving targets are being tracked, not only do topographical features, such as land masses, produce undesirable effects on radar operation, but also meteorological phenomena, such as rain clutter, may cause the lock-on circuit to be incorrectly triggered thereby. Still further, artificial targets produced by countermeasures, as exemplified by confusion reflector material, develop return signals which must be rejected by the radar circuitry if an incorrect identification by the tracking aircraft is to be avoided.

While moving target indicators (MTI) of the above nature are known in combination with ground-based radar stations, they have heretofore not been practicable for installation on aircraft due to the errors introduced into the collected date by movement of the aircraft itself. Since the inherent velocity of the craft upon which the radar is mounted almost without exception has a component in the direction of movement of a nonstationary target, the problem of discriminating between such a target and one which is motionless can be accurately resolved only by taking this radar velocity factor into account. It is true that the radar operator can, within limits, determine the presence or absence of movement in a target by comparing his aircraft airspeed with its closing velocity upon the target. This method is not only of marginal accuracy in many instances, but distracts the radar operator from other duties which must be carried out especially under combat conditions. An automatic process of achieving the desired objective would not only free the radar operator from the necessity of performing manual computations, but would improve the accuracy and speed of target acceptance or rejection by taking into account items which cannot be derived solely from the position of a target image on the radar screen or from the presence or absence of relative velocity between aircraft and target.

The present invention provides airborne radar means for determining automatically the presence or absence of movement in an object onto which the radar has locked. A control variation is developed in accordance with such determination by means of which the object may be accepted or rejected, depending upon whether the aircraft's mission is to reject moving targets and track fixed targets, or to reject fixed targets and track moving targets. Briefly, the above is accomplished by (1) generating a potential which varies as a function of aircraft velocity, (2) modifying such potential in accordance with the angular position and angular motion of the target with respect to the heading of the radar-carrying aircraft, and (3) comparing such modified potential with a range-rate potential from the radar, the latter varying as a function of the relative, or closing, velocity between the radar-carrying aircraft and the target. Equality of the two potentials so compared is indicative of essentially zero velocity of the target, while an unbalance therebetween is applied to condition a target-acquisition network in the event that tracking of moving targets is the objective to be accomplished.

One object of the present invention, therefore, is to provide automatic means designed for incorporation into an airborne radar which will enable the latter to determine within narrow limits the presence or absence of velocity in any object within the range of the radar equipment.

Another object of the invention is to provide airborne radar apparatus designed to track moving targets, and which incorporates means operative solely in respect to motion of the target itself and not to relative motion between the target and the tracking aircraft unless such relative motion includes a motion of the target.

A further object of the invention is to provide means for incorporation into airborne radar apparatus which will yield an indication as to the presence or absence of target velocity by comparing the radar velocity component in the direction of the target with the relative or closing velocity of the radar upon the target.

Other objects and many of the attendant advantages of this invention will be readily appreciated as the same becomes better understood by reference to the following detailed description when considered in connection with the accompanying drawings wherein:

FIGS. 1 and 2 are vector diagrams illustrating the principles upon which the present invention is based;

FIG. 4 is a schematic showing of a modification of certain portions of the circuit represented by the block diagram of FIG. 3.

Figure 3:
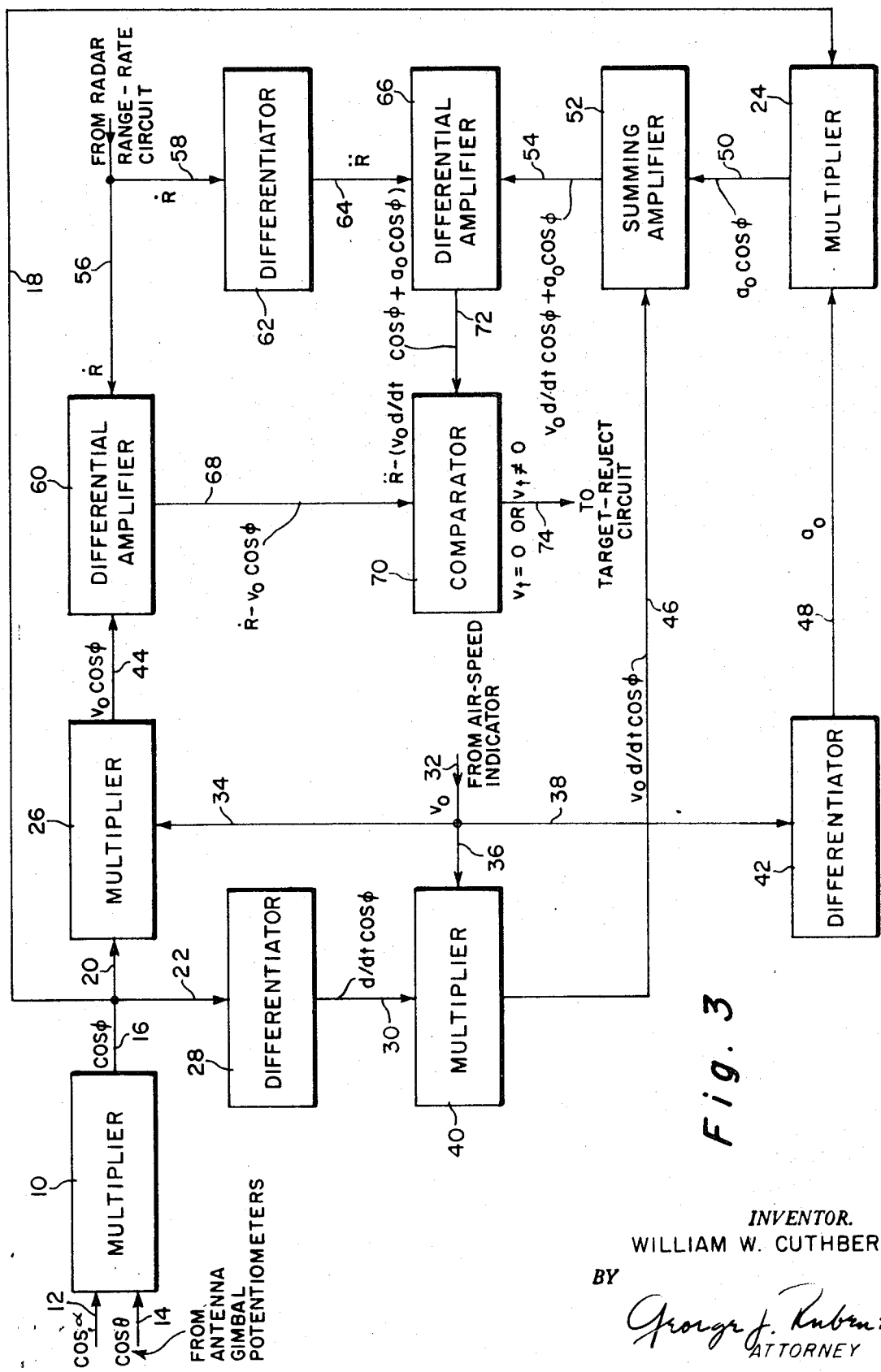
FIG. 3 is a block diagram of a preferred form of circuit arrangement by means of which the objectives of the present invention may be carried out.

In explaining the principles underlying the concept herein disclosed, it is first assumed that, within a volume of space encompassing both a radar-equipped aircraft and an airborne target which the aircraft is designed to track, the velocity of the air is relatively constant in both direction and magnitude. It is then permissible to establish a system of coordinates within this volume of space, which coordinate system moves with the air and at the velocity thereof. Under such an assumed condition, the respective velocities of both the radar-equipped aircraft and the target may be considered with respect to air speed.

Before reference is made to FIG. 1 of the drawings, from which the various velocity components of both target and aircraft are derived, it is helpful to list the symbols which are used in setting forth these derivations. Such symbols include:

$R$ = the range rate or closing velocity between the radar-equipped aircraft and the target
$\dot{R}$ = the rate of change of $R$
$V_o$ = the airspeed of the craft carrying the radar
$a_o$ = the rate of change of $V_o$
$V_t$ = the airspeed of the target
$a_t$ = the rate of change of $V_t$
$\phi$ = the angle formed by a line representing the direction of the target from the radar and a line representing the direction of heading of the radar-equipped aircraft
$\theta$ = the lateral component of $\phi$
$\alpha$ = the vertical component of $\phi$
$\beta$ = the angle formed by a line representing the direction of the target from the radar and a line representing the direction of target velocity With all angles being measured with respect to the center axis of the radar antenna, it will be seen from FIG. 1 that the component of radar airspeed in the direction of the target is
$$V_o \cos \phi$$
and the component of target airspeed along the same axis is
$$V_t \cos \beta.$$
The relative, or closing, velocity can therefor be expressed as
$$R = V_o \cos \phi - V_t \cos \beta. \quad (1)$$
The quantities $V_t$ and $B$ cannot be determined aboard the aircraft on which the radar is mounted. If, however,
$$V_t \cos \beta$$
becomes equal to 0, the remaining equality can be verified from data known or obtainable on such craft, and circuits can be designed (as hereinafter set forth) to selectively accept or reject targets setting the terms of equality.

There are, however, two conditions which meet the requirements of equation (1) when
$$V_t \cos \beta$$

is zero. Either the velocity of the target is 0 (representing, in the example under consideration, a target which should be rejected) or else the angle B is equal to $$\pm \pi/2$$

radians. The latter quantity, indicating a target which should be tracked, constitutes the perfect aspect of beam attack, and can exist only for a very short interval of time. For practical purposes, therefor, this quantity can be disregarded, and all targets rejected which satisfy the equation $$\dot{R} = V_o \cos \phi. \qquad (2)$$

If the values of equation (2) are not accurately known, appreciable target-attitude departures from the perfect aspect of beam attack ($B=\pi/2$ radians)

may bring about rejection of moving targets which should be tracked. To eliminate the possibility that targets of this nature will be incorrectly recognized, additional information regarding their characteristics is required. Such information may be obtained by differentiating equation (1) with respect to time $$\ddot{R}=V_o \ (d/dt \cos \phi) + a_o \cos \phi + V_t \sin \beta \ (dB/dt) - _t \cos \beta. \qquad (3)$$

It is apparent that the quantities $$a_t, V_t \text{ and } B$$

cannot be determined aboard the aircraft on which the radar is mounted. If, however, $$V_t \sin \beta \ (dB/dt) -_t \cos \beta$$

becomes equal to 0 (which will be the case for fixed targets) the remaining equality can be verified from data known or obtainable on such craft, and circuits can be designed to selectively accept or reject targets satisfying the following term $$\ddot{R}=V_o \ (d/dt \cos \phi) = a_o \cos \phi. \qquad (4)$$

When the condition of a beam-attack aspect is present, ambiguities are not produced because, for a moving target, $$db_t/dt$$

assumes a maximum value and $$\sin \pi/2$$

is unity. It is true that ambiguities could arise for an attack aspect and target-motion relationship which can be defined by an equality of the quantities $$V_t \sin \beta \ (dB/dt)$$

and $$a_t \cos \beta.$$

However, since ambiguities resulting from the identity of equation (2) can occur only for beam attack, and since ambiguities resulting from the identity of equation (4) cannot occur for beam attack, simultaneous occurrence of both identities is an indication that the target does indeed have 0 velocity.

Airborne radars, in general, do not measure the resultant angular displacement of a target from the heading of the aircraft carrying the radar. Instead they measure the vertical and lateral components of this angle. In order to solve equations (2) and (4), therefore, it becomes necessary to relate these combined components to such a resultant angular displacement.

Considering FIG. 2, the following trigonometric identities become apparent:

From $\triangle$ DAC, $$\cos \phi = R_{a/r}$$

and from $\triangle$ BAC, $$R_1 = 2 \cos \theta.$$

Therefore, $$\cos \phi = (R_2/R) \cos \theta.$$

But from $\triangle$ DAB, $R_{2/R} = \cos \alpha$ from which $$\cos \phi = \cos \alpha \cos \theta.$$

This relationship may be combined with equations (2) and (4), yielding the following two expressions required to define 0-velocity targets:

$$\dot{R}=V_o \cos \alpha \cos \theta \qquad (5)$$

$$\ddot{R}=V_o(d/dt \ [\cos \alpha \cos \theta]) + a_o \cos \alpha \cos \theta. \qquad (6)$$

Obviously computation of equations (5) and (6) is not practicable except by automatic methods. In accordance with the present invention the quantities involved in these equation are set forth in terms of electrical functions, based upon the following considerations which have been incorporated into the design of the circuit illustrated in FIG. 3 of the drawings.

Airborne radars, in general, develop a potential variation as a function of relative, or closing, velocity between the aircraft on which the radar is mounted and the target being tracked. The quantity $\dot{R}$ is therefore obtainable as this potential amplitude multiplied by a constant of proportionality. A differentiating circuit operating upon this quantity $\dot{R}$ would produce a voltage variation proportional to $\ddot{R}$, or, in other words, to the closing acceleration between aircraft and target. With respect to the velocity of the aircraft upon which the radar is mounted, it is known that an electrical variation representative thereof is obtainable as a function of changes in temperature and pressure conditions derived, for example, from a standard resistive network of conventional design. From this it follows that a differentiating circuit operating upon this quantity $V_o$ would produce a voltage variation proportional to $a_o$, or, in other words, to the acceleration factor of the aircraft upon which the radar is mounted.

Electrical quantities representing $\cos \alpha$ and $\cos \theta$ are obtainable from cosine-taper potentiometers mechanically driven from the radar antenna-positioning gimbal shafts to indicate their azimuthal and elevational displacement. Electronic multiplication of $\cos \alpha$ and $\cos \theta$ is accomplished by means to be hereinafter described, and the product so obtained is then differentiated to yield a voltage variation proportional to its rate of change. Thus, all of the quantities needed to satisfy the conditions of equations (5) and (6) are obtainable aboard the aircraft carrying the radar equipment. The various constants of proportionality can be compensated for by the design of the computer circuitry, and the target rejection apparatus on the aircraft, heretofore operable only by manually controlled means, can be actuated by the output of the computer when the latter has identified the equality of the computer when the latter has identified the equality of the equations.

In FIG. 3 is shown a block diagram of a preferred system for deriving the electrical quantities necessary to solve equations (5) and (6). This system includes function-generating means from which are obtained potentials respectively representing $\cos \alpha$ and $\cos \theta$. Since these means may comprise standard cosine-taper potentiometers mechanically coupled to the azimuth and elevation radar antenna-positioning gimbal shafts, they have not been illustrated in the drawings for the sake of simplicity. The potential representing $\cos \alpha$ is applied to a multiplier 10 over conductor 12, and the potential representing $\cos \theta$ is applied to the same multiplier 10 over a second conductor 14. Multiplier 10 is of a type known in the art, and operates in accordance with the equality set forth above to yield $\cos \phi$. This electrical value appears in output conductor 16.

The electrical quantity representing $\cos \phi$ is respectively applied over conductors 18, 20, and 22 to two further multiplying networks 24 and 26 as well as to a differentiator 28. The multipliers 24 and 26, like the multiplier 10, may be of known design, while the differentiator 28 operates to yield in output conductor 30 the quantity $$d/dt \cos \phi.$$

Over a conductor 32 a further electrical quantity representing $V_o$ is obtained from the airspeed indicator (not shown) of the radar-carrying aircraft. This electrical quantity is respectively applied over conductors 34, 36 and 38 to the multiplier 26, a further multiplier 40, and a differentiator 42. The multiplier 26 yields the quantity $V_o \cos \phi$ in output conductor 44 from the electrical quantities applied thereto over conductors 20 and 34, while the multiplier 40 yields the quantity $V_o d/dt \cos \phi$ in output conductor 46 from the electrical quantities applied through conductors 30 and 36. The network 42 differentiates $V_o$ to yield the quantity $a_o$ in output conductor 48.

As will be seen from FIG. 3, the multiplier 24 receives the electrical quantities $\cos \phi$ and $a_o$ over the conductors 18 and 48, respectively. The output of multiplier 24 is thus $a_o \cos \phi$, which energy is applied over conductor 50 to a summing amplifier 52. The latter also received the electrical quantity $V_o d/dt \cos \phi$ over conductor 46, the output of amplifier 52 as it appears in output conductor 54 thus being $V_o d/dt \cos \phi + a_o \cos \phi$.

From the range-rate circuit of the aircraft radar (not shown) is obtained the quantity $\dot{R}$, defined hereinbefore as the closing velocity between the radar-equipped aircraft and the target. This electrical quantity $\dot{R}$ appears in conductors 56 and 58, the former leading to a differential amplifier 60 and the latter to a differentiator 62 from which is derived the electrical quantity $\ddot{R}$. This quantity $\ddot{R}$ represents the rate of change of $\dot{R}$, or, in other words, the rate of change of the closing velocity between the radar-equipped aircraft and the target, and appears in the conductor 64 which leads to a further differential amplifier 66. The differential amplifier 66 also receives the electrical quantity $V_o d/dt \cos \phi + a_o \cos \phi$, which is applied thereto over conductor 54.

Differential amplifier 60, receiving both the electrical quantities $\dot{R}$ and $V_o \cos \phi$, yields in output conductor 68 a quantity $\dot{R} - V_o \cos \phi$.

The differential amplifier 66 yields the quantity $\ddot{R} - (V_o d/dt \cos \phi + a_o \cos \phi)$ which is applied to a comparator 70 over conductor 72. Comparator 70 also received the electrical quantity $\dot{R} - V_o \cos \phi$ over conductor 68.

It will thus be noted that the comparator network 70 receives electrical quantities corresponding to those of equations (5) and (6) from which it has been demonstrated that presence or absence of velocity in the target may be determined. The comparator circuit 70 is thus able to ascertain that either $V_t = 0$ or $V_t \neq 0$, and the determination so made may be utilized as an "on-off" electrical variation by a target rejection circuit (not shown) of the radar to which it is applied over conductor 74. As above brought out, the radar circuitry to which conductor 74 is connected may be designed either to track moving targets and to reject fixed targets, or to track fixed targets and reject moving targets, depending upon the objective of the particular mission on which the radar-carrying aircraft is engaged.

In some instances it may be desirable to sacrifice a high degree of performance in order to substantially reduce the number of components required in a target-velocity discriminator of the type illustrated in FIG. 3. In other words, instead of solving both equations (5) and (6), it may under some circumstances be advantageous to disregard the beam aspects of attack, in which case only the equality of equation (5) need be identified. A unit so simplified has been incorporated, in an apparatus known as the AN/APQ-51 radar, the range-rate voltage $e$ of which varies in accordance with the equation $e = (-0.00045) \dot{R} + 3$, with $\dot{R}$ being expressed in knots.

As shown in FIG. 4, this radar range-rate voltage $e$ is applied to the control electrode of a vacuum tube 76 which acts to amplify and invert the input signal to yield voltage variations directly proportional to $\dot{R}$, the closing velocity of the radar-equipped aircraft upon the target. The potentiometer $R_v$ (which is calibrated in knots) is coupled mechanically to the aircraft airspeed indicator so as to provide a voltage proportional thereto. Two cosine-taper potentiometers $R\alpha$ and $R\theta$ are mechanically coupled, as above brought out, to the azimuth and elevation antenna-positioning gimbal shafts of the radar to develop voltages similar to those utilized by the circuit of FIg. 3. The respective outputs of potentiometers $R\alpha$ and $R\theta$ are applied to the control electrodes of two electron discharge tubes 78 and 80, and it will be noted that the voltage derived from potentiometer $R_v$ (proportional to aircraft airspeed) is applied to an intermediate point on the cosine-taper potentiometer $R\alpha$, as shown in FIG. 4.

A differential amplifier, composed of the cathode-coupled tubes 80 and 82, compares the range-rate potential from tube 76 with the directed-velocity potential derived from the cosine-taper potentiometer $R\theta$. A relay coil 84 is connected across the respective anodes of tubes 80 and 82 such that, when the tube outputs are equal (as will occur when the applied range-rate potential corresponds to the directed-velocity potential) there will be no voltage difference across the relay coil 84. Under these conditions, the relay switch contacts 86 will be closed. This causes the radar to resume search.

When search is thus resumed, however, the range-rate potential $e$ changes. This induces an unbalance in the output of the differential amplifier 80, 82, and the resulting current flow through the coil 84 actuates the relay to open contacts 86, This permits the radar to acquire the next target.

It has been found that, since an appreciable current flow is required through the relay coil 84 in order for the switch contacts 86 to be open, a very slight state of unbalance in the differential amplifier will not bring about such a condition. Hence, slightly unequal outputs from tubes 80 and 82 may appear as a condition of balance, to result in closure of contacts 86 and rejection of the target. However, such a slight current flow through relay through coil 84 only occurs with targets having a very low velocity, and such low-velocity targets, from a tactical standpoint, ordinarily have no more significance than targets which are essentially stationary.

Obviously many modifications and variations of the present invention are possible in the light of the above teachings. It is therefore to be understood that within the scope of the appended claims the invention may be practiced otherwise than as specifically described.

I claim:

1. Apparatus for determining the presence or absence of motion in a target onto which a range-measuring airborne tracking radar may lock, said apparatus comprising; means for determining the equality of the expression $\dot{R} = V_o \cos \alpha \cos \theta$ (1)

where $\dot{R}$ = the closing velocity between the radar-equipped aircraft and the target $V_o$ = the airspeed of the craft carrying the radar $\alpha$ = the vertical component of $\phi$, the angle formed by a line representing the direction of heading of the radar-equipped aircraft and a line representing the direction of the target from the radar $\theta$ = the lateral component of $\phi$;

further means for determining the equality of the expression $\ddot{R} = V_o(d/dt[\cos \alpha \cos \theta]) + a_o \cos \alpha \cos \theta$ (2)

where, in addition to the definitions set forth for expression (1), $\ddot{R}$ = the rate of change of $\dot{R}$ $a_o$ = the rate of change of $V_o$;

and means operative upon and equality of both expressions (1) and (2) for yielding a control effect indicative of the absence of motion in said target.

2. Apparatus in accordance with claim 1, in which the means for determining the equality of expression (1) includes means for deriving electrical quantities respectively representing $\cos \alpha$ and $\cos \theta$, circuit means for multiplying such electrical quantities to obtain an electrical quantity representative of $\cos \phi$, circuit means for multiplying the electrical quantity $\cos \phi$ with an electrical quantity representing $V_o$, and a first differential amplifier receiving both the electrical quantity $V_o \cos \phi$ and an electrical quantity $\dot{R}$ to yield an output indicative of the difference between such quantities.

3. Apparatus in accordance with claim 2, in which the means for determining the equality of expression (2) additionally includes a differentiator receiving the electrical quantity $\dot{R}$ to yield the quantity $\ddot{R}$, means for differentiating the quantity $V_o$ to yield the quantity $a_o$, means for multiplying the quantity $a_o$ by the quantity $\cos \phi$, means for differentiating the quantity $\cos \phi$ and multiplying the output by $V_o$ to yield $V_o d/dt \cos \phi$, means for adding together the quantities $[V_o d/dt \cos \phi]$ and $[a_o \cos \phi]$, a second differential amplifier to which are applied the respective quantities $$[V_0 d/dt \cos \phi + a_0 \cos \phi]$$

and $[\ddot{R}]$ to yield an output indicative of the difference therebetween, and a comparator network receiving the respective outputs of said first and second differential amplifiers.

4. In an airborne radar apparatus designed to track a target and to yield range information with respect thereto, a differential amplifier including two cathode-coupled electron discharge devices to the respective control electrodes of which are applied a range-rate voltage from the said radar apparatus and an electrical quantity representative of $$V_0 \cos \alpha \cos \theta$$

where $V_o$ = the airspeed of the craft carrying the radar $\alpha$ = the vertical component of $\phi$, the angle formed by a line representing the direction of the target from the radar and a line representing the direction of heading of the radar-equipped aircraft $\theta$ = the lateral component of $\phi$, a two-position relay the coil of which is connected across the anodes of the said two cathode-coupled electron discharge devices, whereby, when the respective outputs of the said two electron discharge devices are identical, no appreciable current will flow through the coil of said relay and the latter will be in one of its said two positions, and, when the respective outputs of the said two electron discharge devices are not identical, current will flow through the coil of said relay and the latter will assume the other of its two said positions.

* * * * *